United States Patent
Styles

(10) Patent No.: US 7,363,919 B1
(45) Date of Patent: Apr. 29, 2008

(54) INTEGRATED EXHAUST GAS RECIRCULATION VALVE AND COOLER SYSTEM

(75) Inventor: Dan Styles, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 11/620,507

(22) Filed: Jan. 5, 2007

(51) Int. Cl.
F02M 25/07 (2006.01)
F01N 3/02 (2006.01)

(52) U.S. Cl. .................................. 123/586.12; 60/320

(58) Field of Classification Search ........... 123/568.12, 123/568.11; 60/320
See application file for complete search history.

(56) References Cited

U.S. PATENT DOCUMENTS

| | | | |
|---|---|---|---|
| 6,035,640 A | 3/2000 | Kolmanovsky et al. | |
| 6,213,105 B1 | 4/2001 | Banzhaf et al. | |
| 6,360,532 B2 * | 3/2002 | Strahle et al. | 123/568.12 |
| 6,367,256 B1 | 4/2002 | McKee | |
| 6,718,956 B2 | 4/2004 | Klipfel et al. | |
| 6,807,955 B2 * | 10/2004 | Leedham et al. | 123/568.12 |
| 6,976,480 B2 | 12/2005 | Miyoshi et al. | |
| 6,976,530 B2 * | 12/2005 | Hayashi et al. | 123/568.12 |
| 7,168,419 B2 * | 1/2007 | Rosin et al. | 123/568.12 |
| 7,210,469 B1 * | 5/2007 | Saele | 123/568.12 |
| 2004/0107949 A1 * | 6/2004 | Miyoshi et al. | 123/568.12 |
| 2005/0039729 A1 * | 2/2005 | Rosin et al. | 123/568.12 |
| 2005/0199381 A1 * | 9/2005 | Mercz et al. | 123/568.12 |
| 2006/0207578 A1 * | 9/2006 | Gallino et al. | 123/568.12 |
| 2006/0288694 A1 * | 12/2006 | Hayashi | 60/320 |
| 2007/0017489 A1 * | 1/2007 | Kuroki et al. | 123/568.12 |
| 2007/0068497 A1 * | 3/2007 | Sugimoto et al. | 123/568.12 |

* cited by examiner

*Primary Examiner*—Stephen K. Cronin
*Assistant Examiner*—Arnold Castro
(74) *Attorney, Agent, or Firm*—Julia Voulyras; Alleman Hall McCoy Russell & Tuttle LLP

(57) ABSTRACT

An exhaust gas recirculation system for an engine positioned in an engine compartment of a vehicle is provided. The system comprises an exhaust gas recirculation cooler positioned in an exhaust gas path of the engine; and an exhaust gas recirculation valve positioned upstream of the cooler in the exhaust gas path and spatially adjacent a side of the cooler that is exposed to decreased ambient temperature in the engine compartment during engine powered vehicle travel.

20 Claims, 3 Drawing Sheets

INTEGRATED EXHAUST GAS RECIRCULATION VALVE AND COOLER SYSTEM

FIELD OF INVENTION

The present application relates to an integrated exhaust gas recirculation valve and cooler system of an internal combustion engine.

BACKGROUND

Exhaust gas recirculation (EGR) systems may be used in internal combustion engines to reduce NOx emissions. In the combustion chambers, the recirculated exhaust gas acts as an inert gas, thus lowering the flame and in-cylinder gas temperature and decreasing the formation of NOx. Further, EGR systems may include coolers to cool the exhaust gas before it is introduced into an intake manifold of a diesel engine.

EGR valves may be required to meter the flow of recirculated exhaust gas to the intake manifold. EGR valves have been disposed on the "cold side" (downstream) of the EGR cooler for improved packaging and temperature durability issues. However, in these configurations, EGR valves may be exposed to condensed exhaust constituents such as hydrocarbons and acidic compounds which create contamination and corrosion. The EGR valve housing may also be sensitive to corrosion from acidic condensates. While a high temperature is beneficial in preventing the condensation of gas and corrosion, the electronic components in the EGR valve may be degraded at the high temperature. Thus, it may be desirable for less heat to be transferred to the electronic components of the EGR valve in some situations.

One approach to solve the above problem is described in the U.S. Pat. No. 6,213,105. In particular, the EGR valve is mounted on the supply side of the exhaust cooler (the side at which the hot exhaust enters) so that there is a relatively small amount of residue from the exhaust adhering to the valve and its valve elements. The adjustment element including electronic components is isolated thermally from the valve and disposed outside the EGR cooler, and accordingly is subject to relatively low heat stress.

However, the inventor herein has recognized disadvantages with such an EGR system. For example, the electronic components are disposed at a hot side of an engine compartment and may still be subject to undesirable heat. Further, this configuration may limit the packaging and the types of EGR valves that can be used in the EGR system because of the requirement of isolation between a valve and its electronic components. Furthermore, the "pick-up" of EGR gases is typically from the rear of the engine, either from the exhaust manifold or turbocharger plumbing. This means that an EGR valve located on the hot side of the EGR cooler is driven to the rear of the engine compartment, close to other hot components and generally in a more restricted package environment due to cowl overhangs and other neighboring components. Under hood temperatures in this area of the engine compartment can exceed the temperature limits of the EGR valve's electrical components even if the electrical components are effectively decoupled from the hot valve body via cooling.

SUMMARY

In one approach, the above issues may be addressed by an exhaust gas recirculation system for an engine positioned in an engine compartment of a vehicle. The system comprises an exhaust gas recirculation cooler positioned in an exhaust gas path of the engine; and an EGR valve positioned upstream of the cooler in the exhaust gas path and spatially adjacent to a forward side of the cooler that is exposed to decreased under hood temperature in the engine compartment during engine powered vehicle travel.

In this way, the EGR valve is disposed upstream from the perspective of the exhaust stream but the EGR valve is spatially located in a region of the engine compartment having lower ambient temperature. Thus, the inside of the valve may be exposed to the higher temperature exhaust which can reduce or eliminate condensation of the exhaust constituents, thereby protecting the valve from deposit build up and corrosion. Meanwhile, the valve is positioned at cold side of the engine compartment so that the degradation of electronic components on the outside of the valve due to external heat from the engine compartment may be reduced.

According to another aspect, the EGR valve may be integrated with the EGR cooler and may be positioned inside a housing of the EGR cooler. According to yet another aspect, an EGR bypass valve may be operatively coupled with the EGR valve. Thus, an EGR bypass system may be integrated with the EGR cooler. The resulting modular assembly is compact and easy to package in the engine compartment.

DETAILED DESCRIPTION

Figure 1:
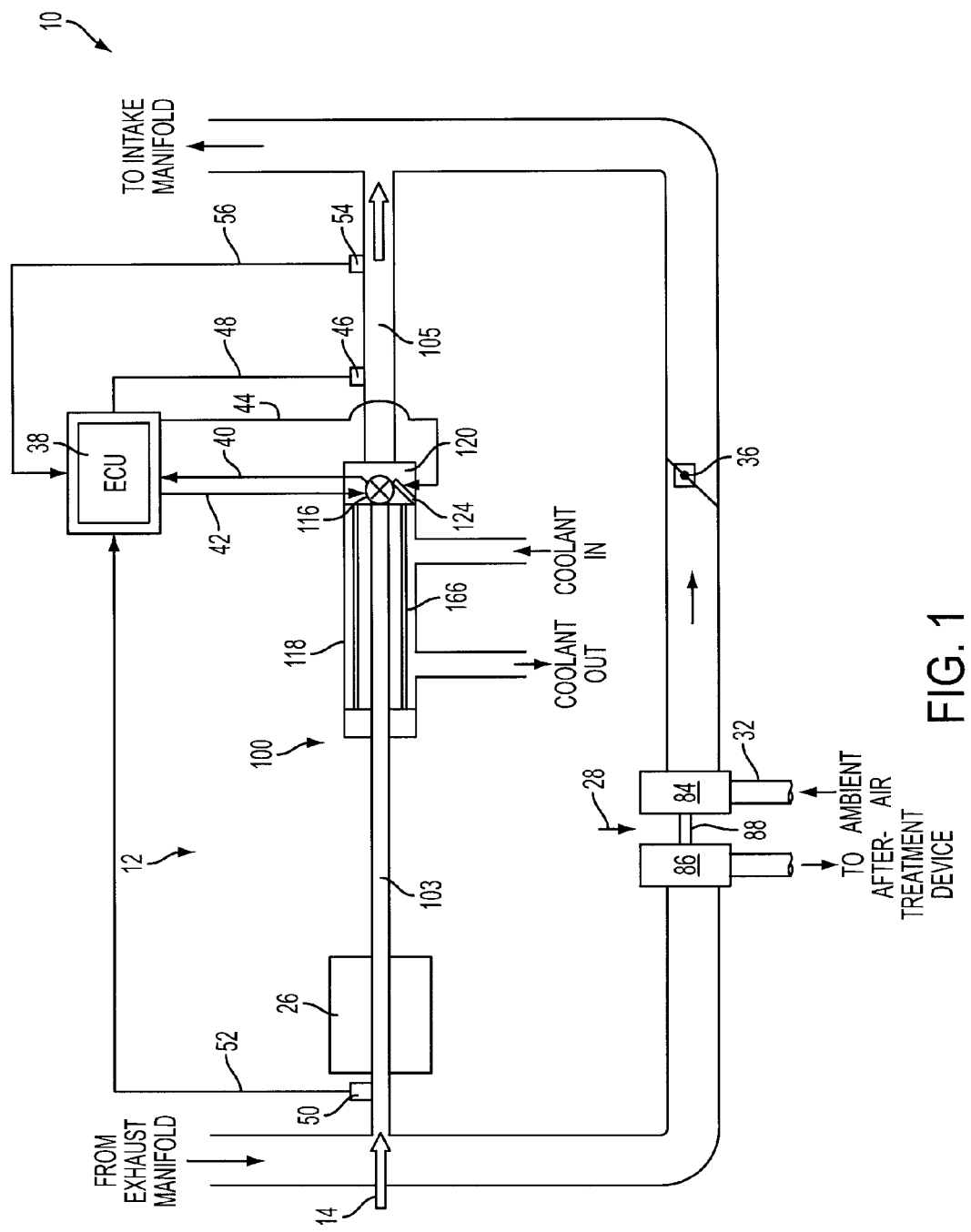
FIG. 1 is a schematic diagram of an exhaust gas and ambient air intake system of an internal combustion engine.

FIG. 1 is a schematic diagram of an exhaust gas and ambient air intake system 10 of an internal combustion engine (not shown). The exhaust gas and ambient air intake system 10 may comprise an EGR system 12 connecting an exhaust manifold (not shown) to an intake manifold (not shown) of the engine. EGR system 12 is configured to allow a portion of exhaust gas as indicated by arrow 14 to be recirculated from the exhaust manifold to the intake manifold. EGR system 12 typically includes an upstream EGR conduit 103 coupled at an upstream end to an output of the exhaust manifold, a downstream EGR conduit 105 coupled at a downstream end to an intake of the intake manifold, and an EGR assembly 100 positioned intermediate the upstream and downstream EGR conduits. EGR assembly 100 includes an EGR valve 116 configured to regulate the amount of exhaust gas recirculated from the exhaust manifold.

In the combustion chambers (not shown), the recirculated exhaust gas acts as an inert gas, thus lowering the flame and in-cylinder gas temperature and decreasing the formation of NOx. The recirculated exhaust gas displaces fresh air and reduces the air-to-fuel ratio of the in-cylinder mixture by reducing excess oxygen. However, in some situations, EGR valve 116 may be degraded by the high temperature of the exhaust gas. Further, an exhaust gas having a high temperature may reduce an EGR effect to decrease NOx emission. Thus, to solve the above problems, an EGR cooler 118 may be included in the EGR assembly of EGR system 12 to decrease the temperature of exhaust gas at some engine operating conditions. In the depicted embodiment, EGR valve 116 is schematically shown to be disposed spatially adjacent to an outlet on a front side 120 of EGR cooler 118. The positioning of EGR valve 116 in EGR system 12 relative to an engine compartment will be described in greater detail below.

In the depicted embodiment, as shown in FIG. 1, coolant may enter EGR cooler 118 at a position adjacent to EGR valve 116, travel a circuitous coolant pathway through the cooler, and exit at an opposite end. It should be appreciated that other coolant pathways may be used in the cooler configuration.

EGR system 12 may further comprise a bypass system. In some embodiments, the bypass system may be integrated into EGR cooler 118. The bypass system includes a bypass valve 124, which upon actuation enables the exhaust gas to be routed through a body of cooler 118 without entering cooling portions 166 of cooler 118, as described in detail below. Alternatively, the bypass system may comprise a separate bypass flow path and a separate bypass valve around the entire cooler. Bypass valve 124 may be actuated based on engine operating conditions. For example, when the engine operates at cold ambient conditions or the engine operates at extended idle, recirculating without cooling exhaust gas may be desirable for providing appropriate temperature in a combustion chamber of an engine. Thus, exhaust gas may be directed to the intake manifold without cooling. In some embodiments, EGR system 12 may include an EGR catalyst 26 disposed along upstream EGR conduit 103.

FIG. 1 further shows that exhaust and ambient air intake system 10 may include a turbocharger 28 coupled downstream in the exhaust gas flow to use exhaust gas energy to increase the mass of the air charge delivered to the engine combustion chamber. This larger mass of air can be burned with a larger quantity of fuel, resulting in more torque and power as compared to naturally aspirated, non-turbocharged engines. Turbocharger 28 may include a compressor 84 and a turbine 86 coupled by a common shaft 88. Exhaust gas passing turbine 86 goes to an aftertreatment device (not shown) before being discharged to the air. In some embodiments, an EGR throttle 36 may be coupled downstream of compressor 84 and upstream of the intake manifold.

The engine systems, including but not limited to exhaust and ambient air intake system 10 and EGR system 12, may be controlled by the engine control unit (ECU) 38. For example, ECU 38 may receive analog exhaust gas valve position sensor (EVP) input 40 from EGR valve 116 and send a valve control output 42 to regulate the operation of EGR valve 116. Further, ECU 38 may send bypass signal 44 to actuate bypass valve 124.

In the ECU 38, command signals such as input 42 and output 44 to the EGR system as well as other command signals may be calculated from measured variables and engine operating parameters. For example, EGR system 12 may include a pressure sensor 46 that provides a signal 48 to ECU 38 indicative of the pressure near EGR valve 116. Likewise, EGR system 12 may include a temperature sensor 50 that provides a signal 52 indicative of temperature upstream of EGR system 12, and a temperature sensor 54 that provides a signal 56 indicative of temperature downstream of EGR assembly 100.

Figure 2:
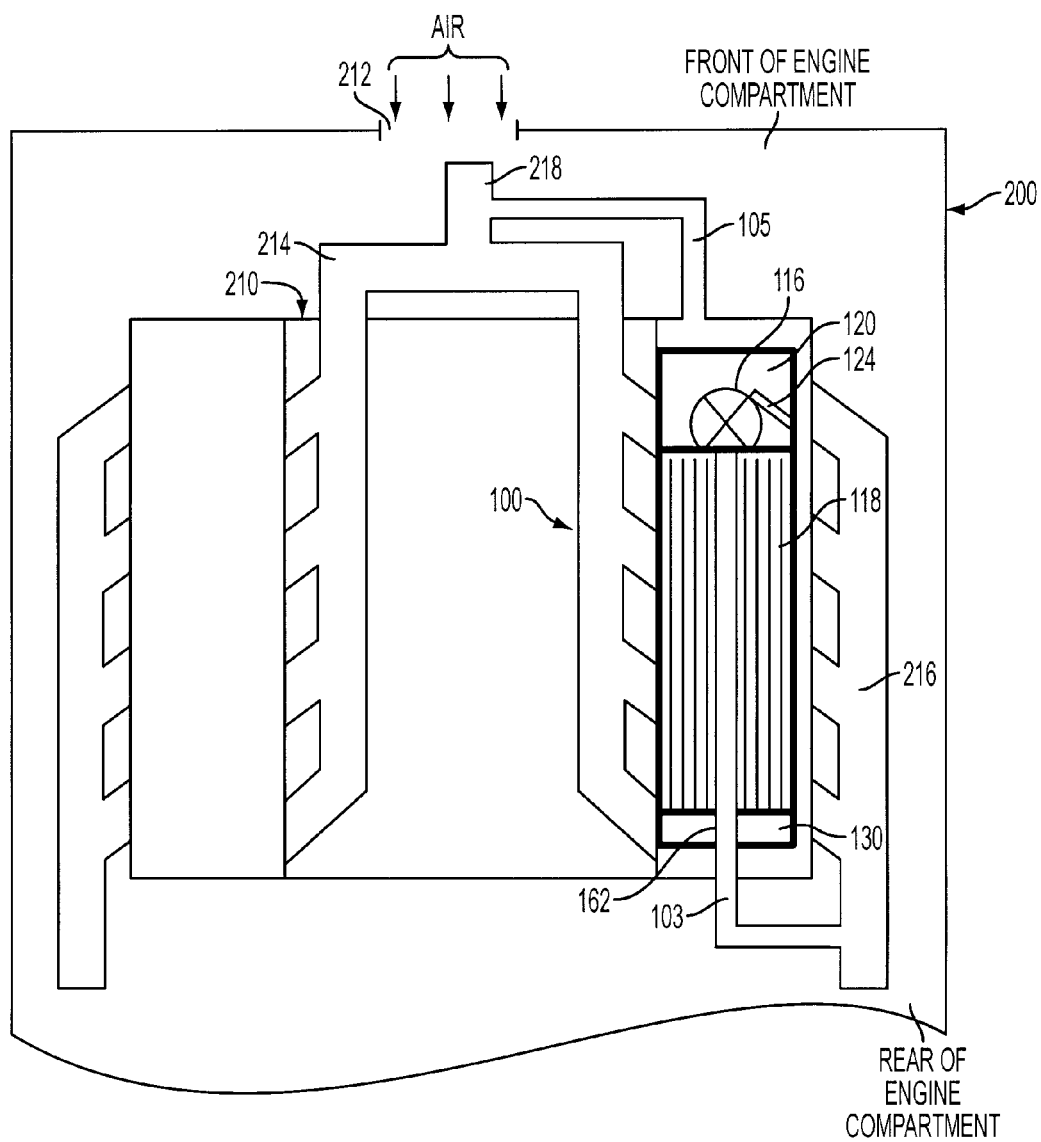
FIG. 2 is a schematic view showing an exemplary EGR assembly of the exhaust gas and ambient air intake system of FIG. 1, illustrating relative positions of an EGR valve, an EGR bypass valve, and an EGR cooler in an engine compartment.

FIG. 2 shows EGR assembly 100 positioned in an engine compartment 200 of a vehicle, schematically illustrating the positioning of EGR valve 116 and EGR cooler 118 relative to the engine compartment. A vent 212 is located at a front of engine compartment 200, which is at a front of the vehicle. Engine 210 is shown to have an intake manifold 214 and exhaust manifold 216. An air intake 218 is configured to guide air to the intake manifold 214. During engine powered vehicle travel, heat generated during operation of the engine and cooling air flowing into engine compartment 200 through vent 212 may combine to produce a temperature gradient within engine compartment 200. For example, a region at a front of engine compartment 200 may have lower ambient temperature while a region at a rear of engine compartment 200 may have higher ambient temperature. In the depicted embodiment, EGR cooler 118 includes an outlet on a front side 120 at a front region of engine compartment 200 and an inlet on a rear side 130 at a rear region of engine compartment 200.

Figure 3:
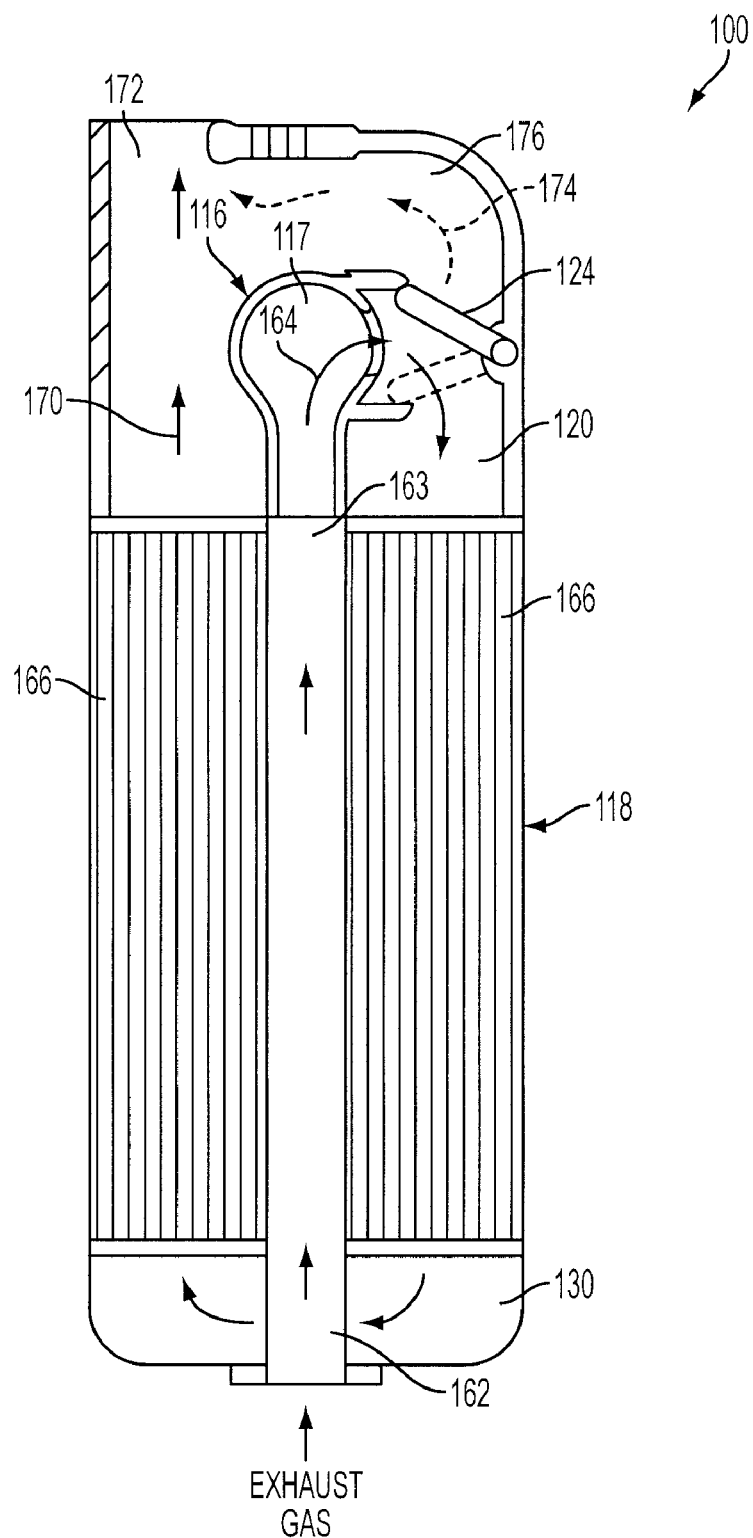
FIG. 3 shows a cross-sectional view of the EGR assembly of FIG. 2.

FIG. 3 shows a cross-sectional view of an exemplary embodiment of EGR assembly 100 of EGR system 12, illustrating EGR cooler 118, EGR valve 116 and EGR bypass valve 124. In some embodiments, EGR assembly 100 may be configured in a way such that an inside 117 of EGR valve 116 may be exposed to an exhaust stream that is not yet cooled by cooling portions 166 of EGR cooler 118, i.e. the EGR valve may be positioned upstream of EGR cooler 118 in terms of exhaust gas flow. However, EGR valve 116 may still be configured to be located at a cold region of the engine compartment. For example, in some embodiments, EGR cooler 118 may include an inlet passage 162 that travels from a rear side 130 to an inlet 163 adjacent to front side 120, configured to allow exhaust gas to pass therethrough without substantial cooling effect on the exhaust gas. In some embodiments, inlet passage 162 may travel substantially through the length of cooler 118, from one side of the cooler 118 positioned in a region of higher ambient temperature in the engine compartment, to the other side of the cooler positioned in a region lower ambient temperature of the engine compartment. In the depicted embodiment, inlet passage 162 includes a tube disposed substantially at a center of cooler 118. Exhaust stream as indicated by arrow 164 reaches housing 117 of EGR valve 116 without passing cooling portions 166 of EGR cooler 118. Then, exhaust stream 164 passing through EGR valve 116 may go through cooling portions 166, if so directed by bypass valve 124. The cooled exhaust stream 170 exits EGR assembly 100 from an exhaust outlet 172 of the EGR assembly. Thus, EGR valve 116 is positioned upstream of EGR cooler 118 in terms of exhaust gas flow while EGR valve 116 is positioned spatially adjacent to outlet 172 of EGR assembly 100.

In the depicted embodiment, EGR valve 116 is shown to be encompassed by housing 176 and coupled to the EGR cooler 118 in an integrated EGR assembly 100. It should be appreciated that other embodiments are possible. For example, EGR valve 116 may be integrated into EGR cooler 118 while the EGR body is exposed to ambient air in the engine compartment without being included in a housing such as 176.

Now referring back to FIG. 2, in the depicted embodiment, front side 120 of EGR cooler 118 is configured to include EGR valve 116. Thus, EGR valve 116 is spatially positioned at the front region of the engine compartment having lower ambient temperature during engine powered travel, due to the temperature gradient across the engine compartment, discussed above.

As discussed above, in some engine operating conditions, exhaust bypass of EGR cooler 118 may be desirable. For example, when an engine operates at cold ambient conditions or at an extended idle, recirculated exhaust gas having relatively high temperature may be desired to maintain appropriate combustion temperature in the combustion chamber. In some embodiments, the EGR bypass system may be integrated with the EGR valve. Now referring to FIG. 3, EGR bypass valve 124 is shown to be operatively coupled with EGR valve 116. EGR bypass valve 124 may have a closed state and an open state. At the closed state, as shown by a solid line, exhaust stream 164 is directed toward cooling portions 166 of EGR cooler 118. At the open state, as shown by a dashed line, an exhaust flow path to cooling portions 166 is closed, and the uncooled exhaust stream 174 is passed directly to exhaust exit 172 without being passed through EGR cooler 118. A portion of housing 176 is used as a pathway for bypassing exhaust stream 174.

In the embodiment depicted in FIG. 3, EGR cooler 118 is a U-shaped cooler, having both an inlet to the cooler and an outlet from the cooler on the same side. Alternatively, other configurations may be employed. Typically, EGR valve 116 and bypass valve 124 are separate components positioned inside housing 176. Alternatively, EGR valve 116 and EGR bypass valve 124 may be replaced by a bi-directional piston style combination valve. While typically a separate bypass pipe around the cooler is not included, it should be appreciated that a separate EGR bypass flow path such as a pipe and separate EGR bypass valve may be used if desired.

Further, it should be appreciated that any suitable cooler may be used to implement the invention of this application.

The EGR systems described above have various advantages. For example, the EGR valve is located upstream of exhaust flow entering the EGR cooler while the EGR valve is spatially positioned in a relatively cold region of an engine compartment where there is lower ambient temperature during engine powered vehicle travel. In this way, the body of the valve may be exposed to the uncooled exhaust gas having a higher temperature so that condensation of the exhaust constituents may be reduced or eliminated, thereby protecting the valve from deposit build up and corrosion. Meanwhile, since the valve is positioned at a cold region of the engine compartment, the degradation of electronic components and other heat-sensitive components may be reduced.

As discussed above, the EGR system described above is modular and integrated in nature. By integrating the EGR valve, the EGR bypass valve, and the EGR cooler in a combined EGR assembly housing, a portion of the housing may be used as a bypass flow path without a separate bypass pipe. The resulting modular assembly is compact and easy to package in the engine compartment.

It will be appreciated that the processes disclosed herein are exemplary in nature, and that these specific embodiments are not to be considered in a limiting sense, because numerous variations are possible. The subject matter of the present disclosure includes all novel and non-obvious combinations and subcombinations of the various structures, and other features, functions, and/or properties disclosed herein.

The following claims particularly point out certain combinations and subcombinations regarded as novel and non-obvious. These claims may refer to "an" element or "a first" element or the equivalent thereof. Such claims should be understood to include incorporation of one or more such elements, neither requiring nor excluding two or more such elements. Other combinations and subcombinations of methods and system component configurations, processes, apparatuses, and/or other features, functions, elements, and/ or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An exhaust gas recirculation system for an engine positioned in an engine compartment of a vehicle, the system comprising:
   an exhaust gas recirculation cooler positioned in an exhaust gas path of the engine, the exhaust gas recirculation cooler including a cooler inlet and a cooler outlet, both located at a front side of the exhaust gas recirculation cooler; and
   an exhaust gas recirculation valve positioned upstream of the cooler in the exhaust gas path and spatially adjacent a side of the cooler that is exposed to decreased ambient temperature in the engine compartment during engine powered vehicle travel.

2. The exhaust gas recirculation system of claim 1, wherein a front of the engine compartment experiences decreased ambient temperature relative to a rear of the engine compartment during engine powered vehicle travel, and wherein the exhaust gas recirculation valve is positioned spatially adjacent a front side of the cooler, which is positioned closer to the front of the engine compartment than the rear of the engine compartment.

3. The exhaust gas recirculation system of claim 1, further comprising a bypass flow path configured to guide exhaust gas around the cooler, the bypass flow path including a bypass valve configured to regulate the flow of exhaust gas through the bypass flow route.

4. The exhaust gas recirculation system of claim 3, wherein the bypass valve is located adjacent to the exhaust gas recirculation valve.

5. The exhaust gas recirculation system of claim 3, wherein the bypass valve is operatively coupled with the exhaust gas recirculation valve wherein the bypass valve is configured to enable the exhaust stream to bypass the exhaust gas recirculation cooler in an open state and enable the exhaust stream to pass the cooling portions of the exhaust gas recirculation cooler in a closed state.

6. The exhaust gas recirculation system of claim 2, wherein the exhaust gas recirculation system further comprises a control system operating the exhaust gas recirculation valve and the bypass valve to enable the exhaust gas to flow along the recirculation flow path at a first engine operating condition and flow along the bypass flow path at a second engine operating condition.

7. The exhaust gas recirculation system of claim 6, wherein the second engine operating condition is one of a cold ambient temperature operation and an extended idle operation.

8. The exhaust gas recirculation system of claim 1, wherein the cooler is substantially U-shaped.

9. The exhaust gas recirculation system of claim 1, wherein the exhaust gas recirculation valve is integrated in a housing of the exhaust gas recirculation cooler.

10. The exhaust gas recirculation system of claim 9, wherein the exhaust gas recirculation valve and the bypass valve are located in a housing of the exhaust gas recirculation cooler and a portion of the housing is configured to be the bypass flow path.

11. The exhaust gas recirculation system of claim 10, wherein the housing further includes an inlet passage that travels from a rear side of the cooler to the inlet at the front side of the cooler.

12. The exhaust gas recirculation system of claim 10, wherein the inlet passage travels through the cooler for the length of the cooler.

13. The exhaust gas recirculation system of claim 9, wherein the housing further includes an outlet passageway extending from the outlet on the front side of the cooler.

14. The exhaust gas recirculation system of claim 1, wherein the exhaust gas recirculation system further comprises an exhaust gas recirculation catalyst upstream of the exhaust gas recirculation cooler.

15. A system for a vehicle, comprising:
an engine compartment having a front at a front of the vehicle, and a rear toward a rear of the vehicle;
an engine mounted longitudinally in the engine compartment;
an exhaust gas recirculation system for the engine, where heat generated during operation of the engine and cooling air flowing into the engine compartment through a vent during vehicle travel combine to produce a temperature gradient within the engine compartment between a region of higher ambient temperature adjacent the engine in the rear and a region of lower ambient temperature adjacent the vent toward the front, the exhaust gas recirculation system including an exhaust gas recirculation valve positioned in an exhaust gas flow path of the engine and an exhaust gas recirculation cooler positioned along the exhaust gas flow path, wherein the exhaust gas recirculation cooler includes a front end and a rear end, the rear end being positioned closer to a region of increased temperature of the engine compartment than the front end, wherein the exhaust gas recirculation valve is positioned within the exhaust gas path upstream of the cooler; and
wherein the exhaust gas recirculation valve is positioned adjacent the front end of the exhaust gas recirculation cooler.

16. The system of claim 15, wherein the exhaust gas recirculation system further comprises an exhaust gas bypass valve that is operatively coupled to the exhaust gas recirculation valve to enable the exhaust stream to bypass the exhaust gas recirculation cooler in an open state and enable the exhaust stream pass the cooling portions of the exhaust gas recirculation cooler in a closed state.

17. The system of claim 16, wherein the front end of the exhaust gas recirculation cooler includes a housing wherein the exhaust gas recirculation valve and the exhaust gas bypass valve are disposed inside the housing.

18. The system of claim 17, wherein a portion of the housing forms an exhaust gas bypass flow path when the exhaust gas bypass valve is in the open state, and wherein the cooler is U-shaped.

19. An exhaust gas recirculation system, comprising:
an exhaust gas recirculation cooler having cooling portions in communication with engine coolant;
an exhaust gas recirculation valve integrated inside a housing of the exhaust gas recirculation cooler, wherein the exhaust gas recirculation valve is disposed upstream of an exhaust stream entering the exhaust gas recirculation cooling portions and is positioned adjacent to an outlet of exhaust gas from the exhaust recirculation cooling portions;
a bypass flow path that at least is partially inside the housing of the exhaust gas recirculation cooler; and
a bypass valve adjacent to the exhaust gas recirculation valve.

20. The system of claim 19 where the exhaust gas recirculation cooler includes a cooler inlet and a cooler outlet, both located at a front side of the exhaust gas recirculation cooler.

* * * * *